(12) United States Patent  
Barker (10) Patent No.: US 7,840,710 B2
(45) Date of Patent: Nov. 23, 2010

(54) METHOD, SYSTEM AND APPARATUS FOR SELECTIVE APPLICATION ACCESS AND SYNCHRONIZATION

(75) Inventor: Melanie Barker, Kanata (CA)

(73) Assignee: Research In Motion Limited, Waterloo (CA)

( * ) Notice: Subject to any disclaimer, the term of this patent is extended or adjusted under 35 U.S.C. 154(b) by 1153 days.

(21) Appl. No.: 11/216,796

(22) Filed: Aug. 31, 2005

(65) Prior Publication Data

US 2007/0050502 A1 Mar. 1, 2007

(51) Int. Cl.
*G06F 15/16* (2006.01)
(52) U.S. Cl. .................... 709/248; 709/203; 709/217; 709/225; 709/229; 709/239
(58) Field of Classification Search ................. 709/203, 709/217, 225, 229, 239, 248, 227
See application file for complete search history.

(56) References Cited

U.S. PATENT DOCUMENTS

| | | | | |
|---|---|---|---|---|
| 5,761,439 | A * | 6/1998 | Kar et al. ................... | 709/248 |
| 5,928,329 | A | 7/1999 | Clark et al. | |
| 6,205,448 | B1 * | 3/2001 | Kruglikov et al. .......... | 707/200 |
| 6,341,316 | B1 * | 1/2002 | Kloba et al. ............... | 709/248 |
| 6,457,062 | B1 | 9/2002 | Pivowar et al. | |
| 6,505,055 | B1 * | 1/2003 | Kahn et al. ................ | 455/564 |
| 6,606,362 | B1 * | 8/2003 | Dalzell et al. .............. | 375/356 |
| 6,654,815 | B1 * | 11/2003 | Goss et al. ................. | 709/248 |
| 6,829,290 | B1 * | 12/2004 | Schmidl et al. ............ | 375/147 |
| 6,944,656 | B2 * | 9/2005 | Evrard et al. .............. | 709/223 |
| 6,950,991 | B2 * | 9/2005 | Bloomfield et al. ........ | 715/738 |
| 6,952,714 | B2 * | 10/2005 | Peart ......................... | 709/203 |
| 6,986,060 | B1 * | 1/2006 | Wong ......................... | 726/26 |
| 7,024,214 | B2 * | 4/2006 | Loveland ................... | 455/502 |
| 7,275,103 | B1 * | 9/2007 | Thrasher et al. ............ | 709/224 |
| 7,373,349 | B2 * | 5/2008 | O'Brien et al. ............ | 707/100 |
| 7,613,835 | B2 * | 11/2009 | Sato ........................... | 709/248 |
| 7,643,833 | B2 * | 1/2010 | Sankisa ...................... | 455/456.1 |
| 2001/0034771 | A1 * | 10/2001 | Hutsch et al. .............. | 709/217 |
| 2001/0047394 | A1 * | 11/2001 | Kloba et al. ............... | 709/217 |
| 2002/0059256 | A1 | 5/2002 | Halim et al. | |
| 2002/0065919 | A1 * | 5/2002 | Taylor et al. ............... | 709/226 |

(Continued)

OTHER PUBLICATIONS

European Search Report; European Patent Office; Oct. 17, 2005; 3 pages.

*Primary Examiner*—Michael Won
(74) *Attorney, Agent, or Firm*—The Danamraj Law Group, P.C.

(57) ABSTRACT

A method, system and apparatus for synchronizing data between a mobile communication device (116) and an external computer (104-1) across one of a plurality of communication paths (402, 422). A first application (404) resident on the mobile communication device (116) is operable to synchronize with the external computer (104-1) via a first communication path (402). A second application (406) resident on the mobile communication device is operable to synchronize with the external computer (104-1) via a second communication path (422). A related remote application (416) is resident on the external computer (104-1). A preferred application is selected by the user from the first and second applications (404, 406). The mobile communication device (116) synchronizes data associated with the preferred application with data associated with the related remote application (116) via the communication path associated with the preferred application.

17 Claims, 6 Drawing Sheets

U.S. PATENT DOCUMENTS

| | | | |
|---|---|---|---|
| 2002/0196279 A1* | 12/2002 | Bloomfield et al. | 345/749 |
| 2003/0065816 A1 | 4/2003 | Dharmadhikari et al. | |
| 2003/0079018 A1* | 4/2003 | Lolayekar et al. | 709/226 |
| 2003/0203731 A1* | 10/2003 | King et al. | 455/407 |
| 2005/0195793 A1* | 9/2005 | Dalton et al. | 370/350 |
| 2005/0210101 A1* | 9/2005 | Janik | 709/203 |
| 2006/0057960 A1* | 3/2006 | Tran | 455/41.2 |
| 2008/0114953 A1* | 5/2008 | Takatsuka | 711/162 |
| 2008/0133775 A1* | 6/2008 | Peterson et al. | 709/248 |

* cited by examiner

METHOD, SYSTEM AND APPARATUS FOR SELECTIVE APPLICATION ACCESS AND SYNCHRONIZATION

TECHNICAL FIELD OF THE APPLICATION

The present disclosure generally relates to wireless packet data service networks. More particularly, and not by way of any limitation, the present disclosure is directed to a mobile communications device and related data service network employing a method, apparatus and system for selectively synchronizing data between a user preferred application and a related remote application.

BACKGROUND

The present disclosure is directed toward synchronizing data between an external computer and a mobile communication device. In the field of mobile communications, it is common for a mobile device and a fixed device to employ mirrored databases. Such databases include, but are not limited to, contacts databases, message databases and calendar databases. In general, a first database may be stored on a server containing a first set of data, and a second database may be stored on a mobile communication device containing a second set of data. Either database may be completely or partly inclusive of the other database. Where the data stored in one database is expected to mirror the data stored in the other database, it is desirable to update the outdated database expeditiously and efficiently.

BRIEF DESCRIPTION OF THE DRAWINGS

A more complete understanding of the embodiments of the present disclosure may be had by reference to the following Detailed Description when taken in conjunction with the accompanying drawings wherein.

DETAILED DESCRIPTION OF THE DRAWINGS

A system and method of the present disclosure will now be described with reference to various examples of how the embodiments can best be made and used. Identical reference numerals are used throughout the description and several views of the drawings to indicate identical or corresponding parts, wherein the various elements are not necessarily drawn to scale.

The present disclosure relates to a device, method and system for selectively synchronizing a preferred application resident on a mobile communications device and an application resident on an external computer, which may be a server. According to a first aspect, the present disclosure relates to a mobile communication device having a first application, a second application and a third application resident thereon. The first application is operable to communicate and synchronize, via a first communication path, with a remote application operating on an external computer. The second application is operable to communicate and synchronize with the remote application via a second communication path. The third application is operable to receive a user identification of a preferred application selected from the first and second applications and to restrict a user's access to the other application not selected as the preferred application, thereby using the communication path associated with the preferred application to synchronize the mobile communication device with the external computer.

In certain embodiments, the first application, the second application and the remote application may be of the same type. The applications may, for example, be calendar applications, messaging applications or a contacts management applications. The first communication path may comprise a wireless link, including a cellular link, a WiFi link, a Bluetooth link, a Zigbee/IEEE 802.15.4 link or an infrared link, as examples. The second communication path may comprise a direct wired connection between the mobile communication device and the remote computer, including a USB connection, an IEEE-1394 connection, an Ethernet connection, an RS-232 connection or a PSTN connection, as examples.

According to a second aspect, the present disclosure relates to method of synchronizing data between a mobile communication device and an external computer. The method comprises the steps of receiving from a user an identification of a preferred application selected from a first application operable to communicate and synchronize via a first communication path with a related remote application executing on the external computer and a second application operable to communicate and synchronize via a second communication path with the related remote application executing on the external computer, storing data associated with the preferred application on the mobile communication device, storing data associated with the related remote application on the external computer, establishing a connection from the mobile communication device to the external computer via the communication path associated with the preferred application and synchronizing data associated with the preferred application with data associated with the related remote application via the communication path associated with the preferred application.

According to a third aspect, the present disclosure relates to a mobile communication system. The system comprises a mobile computing device having a first application and a second application stored thereon, an external computer having a related remote application executing thereon, means for storing data associated with the first application and second application on the mobile communication device, means for storing data associated with the related remote application on the external computer, first means for communicating and synchronizing, via a first communication path, the first application to the related remote application, second means for communicating and synchronizing, via a second communication path, the second application to the related remote application and means operable to receive a user identification of a preferred application selected from the first application and second application and to restrict user access to the other of the first and second applications, thereby using the communication path associated with the preferred application to synchronize the mobile communication device with the external computer.

Figure 1:
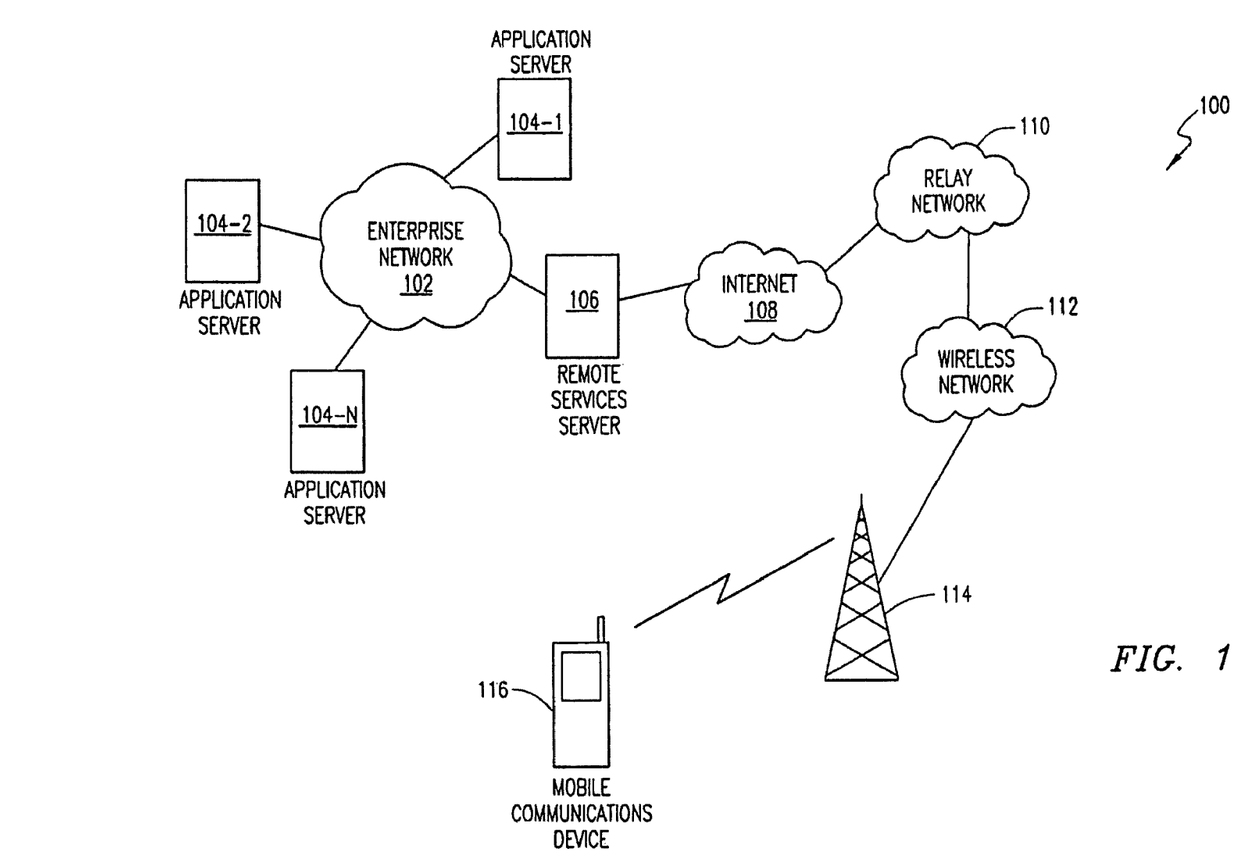
FIG. 1 depicts an exemplary network environment including a wireless packet data service network wherein an embodiment of the present disclosure may be practiced.

Referring now to the drawings, and more particularly to FIG. 1, depicted therein is an exemplary network environment 100 including a wireless packet data service network 112 wherein an embodiment of the present system may be practiced. An enterprise network 102, which may be a packet-switched network, can include one or more geographic sites and be organized as a local area network (LAN), wide area network (WAN) or metropolitan area network (MAN), et cetera, for serving a plurality of corporate users.

A number of application servers 104-1 through 104-N disposed as part of the enterprise network 102 are operable to provide or effectuate a host of internal and external services such as email, video mail, Internet access, corporate data access, messaging, calendaring and scheduling, information management, and the like. Accordingly, a diverse array of personal information appliances such as desktop computers, laptop computers, palmtop computers, et cetera, although not specifically shown in FIG. 1, may be operably networked to one or more of the application servers 104-$i$, $i=1, 2, \ldots, N$, with respect to the services supported in the enterprise network 102.

Additionally, a remote services server 106 may be interfaced with the enterprise network 102 for enabling a corporate user to access or effectuate any of the services from a remote location using a suitable mobile communications device 116. A secure communication link with end-to-end encryption may be established that is mediated through an external IP network, i.e., a public packet-switched network such as the Internet 108, as well as the wireless packet data service network 112 operable with Mobile communications device 116 via suitable wireless network infrastructure that includes a base station (BS) 114. In one embodiment, a trusted relay network 110 may be disposed between the Internet 108 and the infrastructure of wireless packet data service network 112. By way of example, mobile communications device 116 may be a data-enabled handheld device capable of receiving and sending messages, web browsing, interfacing with corporate application servers, et cetera.

For purposes of the present disclosure, the wireless packet data service network 112 may be implemented in any known or heretofore unknown mobile communications technologies and network protocols. For instance, the wireless packet data service network 112 may be comprised of a General Packet Radio Service (GPRS) network that provides a packet radio access for mobile devices using the cellular infrastructure of a Global System for Mobile Communications (GSM)-based carrier network. In other implementations, the wireless packet data service network 112 may comprise an Enhanced Data Rates for GSM Evolution (EDGE) network, an Integrated Digital Enhanced Network (IDEN), a Code Division Multiple Access (CDMA) network, or any 3rd Generation (3G) network. By way of providing an exemplary embodiment, the teachings of the present disclosure will be illustrated with a GPRS-based carrier network, although those skilled in the art should readily recognize that the scope of the present disclosure is not limited thereby.

Figure 2:
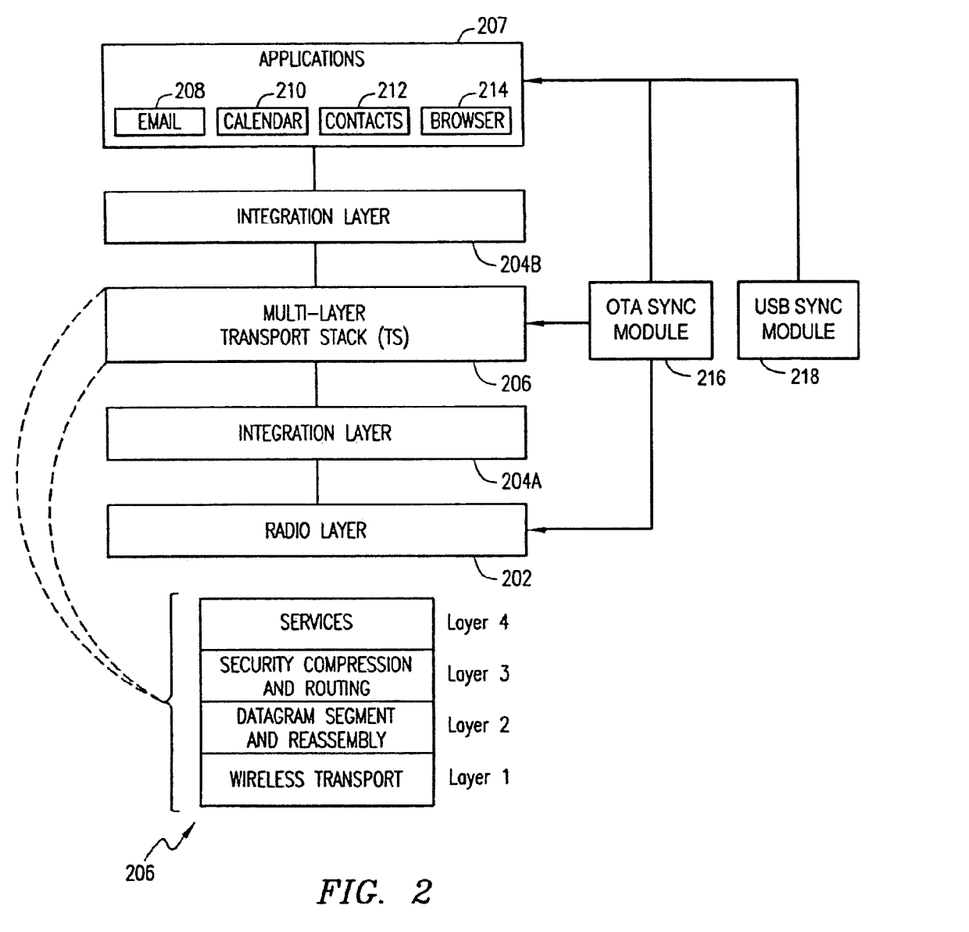
FIG. 2 depicts a software architectural view of a mobile communications device operable to selectively synchronize data between a user preferred application and a related remote application according to one embodiment.

FIG. 2 depicts a software architectural view of a mobile communications device according to one embodiment. A multi-layer transport stack (TS) 206 is operable to provide a generic data transport protocol for any type of corporate data, including email, via a reliable, secure and seamless continuous connection to a wireless packet data service network. As illustrated in this embodiment, an integration layer 204A is operable as an interface between the radio layer 202 and the transport stack 206 of mobile communications device 116. Likewise, another integration layer 204B is provided for interfacing between the transport stack 206 and the user applications 207 supported on the mobile communications device 116, e.g., email 208, calendar/scheduler 210, contact management 212 and browser 214. Although not specifically shown, the transport stack 206 may also be interfaced with the operating system of mobile communications device 116. In another implementation, the transport stack 206 may be provided as part of a data communications client module operable as a host-independent virtual machine on a mobile device. As seen in FIG. 2, an over the air synchronization module 216 is disposed between radio layer 202 and transport stack 206. Over the air synchronization module 216 is also operably connected to applications block 207, along with wired synchronization module 218. The function and operability of over the air synchronization module 216 and wired synchronization module 218 are described in detail below.

The bottom layer (Layer 1) of the transport stack 206 is operable as an interface to the wireless network's packet layer. Layer 1 handles basic service coordination within the exemplary network environment 100 shown in FIG. 1. For example, when a mobile communications device roams from one carrier network to another, Layer 1 verifies that the packets are relayed to the appropriate wireless network and that any packets that are pending from the previous network are rerouted to the current network. The top layer (Layer 4) exposes various application interfaces to the services supported on the mobile communications device. The remaining two layers of the transport stack 206, Layer 2 and Layer 3, are responsible for datagram segmentation/reassembly and security, compression and routing, respectively.

Figure 3:
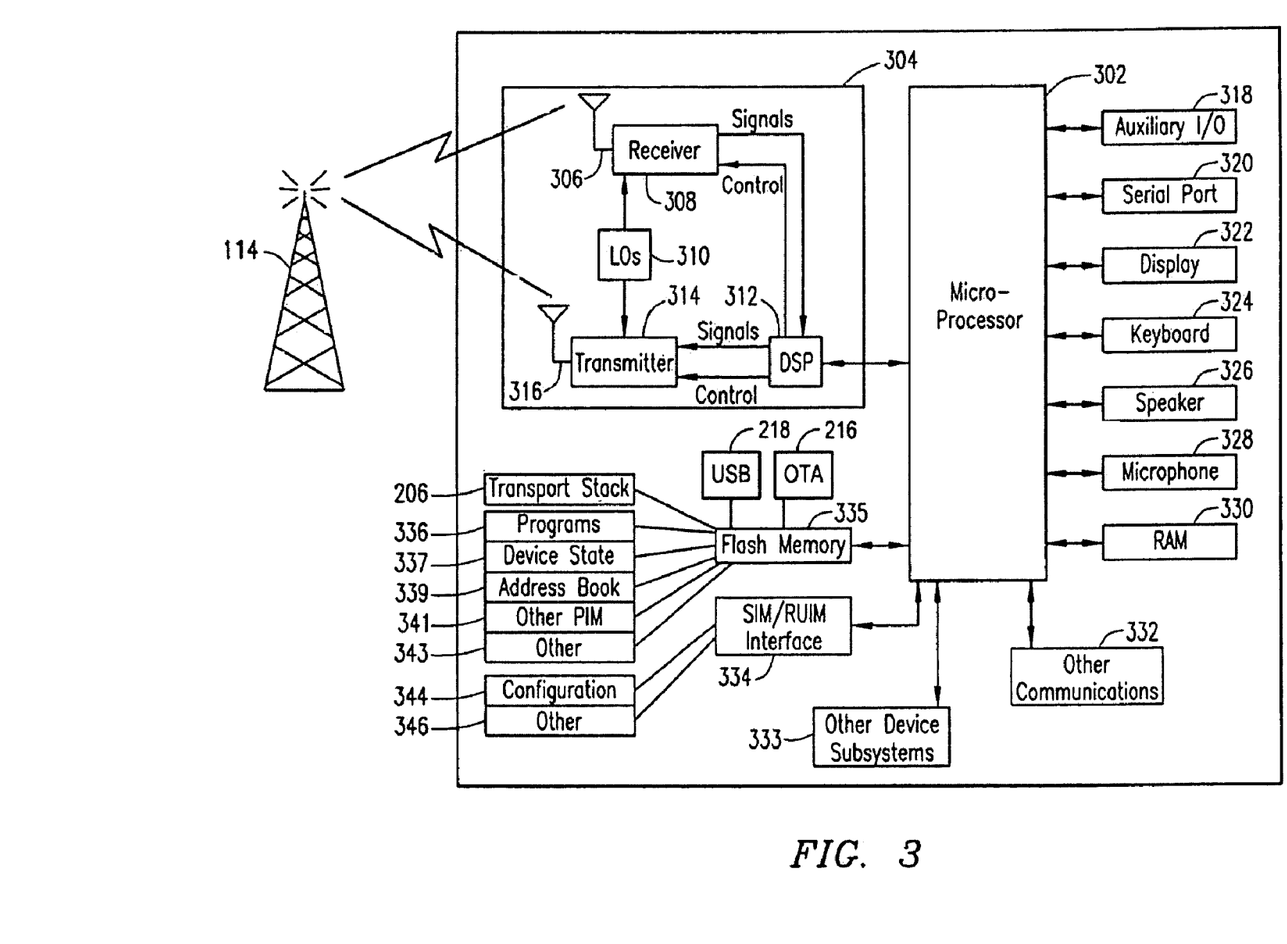
FIG. 3 depicts a block diagram of a mobile communications device operable to selectively synchronize data between a user preferred application and a related remote application according to one embodiment.

FIG. 3 depicts a block diagram of a mobile communications device according to one embodiment. It will be recognized by those skilled in the art upon reference hereto that although an embodiment of mobile communications device 116 may comprise an arrangement similar to one shown in FIG. 3, there can be a number of variations and modifications, in hardware, software or firmware, with respect to the various modules depicted. Accordingly, the arrangement of FIG. 3 should be taken as illustrative rather than limiting with respect to the embodiments of the present disclosure.

A microprocessor 302 providing for the overall control of an embodiment of Mobile communications device 116 is operably coupled to a communication subsystem 304 which includes a receiver 308 and transmitter 314 as well as associated components such as one or more local oscillator (LO) modules 310 and a processing module such as a digital signal processor 312. As will be apparent to those skilled in the field of communications, the particular design of the communication module 304 may be dependent upon the communications network with which the mobile communications device 116 is intended to operate.

In one embodiment, the communication module 304 is operable with both voice and data communications. Regardless of the particular design, however, signals received by antenna 306 through base station 114 are provided to receiver 308, which may perform such common receiver functions as signal amplification, frequency down conversion, filtering, channel selection, analog-to-digital (A/D) conversion, and the like. Similarly, signals to be transmitted are processed, including modulation and encoding, for example, by digital signal processor 312, and provided to transmitter 314 for digital-to-analog (D/A) conversion, frequency up conversion, filtering, amplification and transmission over the air-radio interface via antenna 316.

Microprocessor 302 also interfaces with further device subsystems such as auxiliary input/output (I/O) 318, serial port 320, display 322, keyboard 324, speaker 326, microphone 328, random access memory (RAM) 330, a short-range communications subsystem 332, and any other device subsystems generally labeled as reference numeral 333. To control access, a Subscriber Identity Module (SIM) or Removable User Identity Module (RUIM) interface 334 is also provided in communication with the microprocessor 302.

In one implementation, SIM/RUIM interface 334 is operable with a SIM/RUIM card having a number of key configurations 344 and other information 346 such as identification and subscriber-related data. Operating system software and transport stack software may be embodied in a persistent storage module (i.e., non-volatile storage) such as Flash memory 335. In one implementation, flash memory 335 may be segregated into different areas, e.g., storage area for computer programs 336 as well as data storage regions such as device state 337, address book 339, other personal information manager (PIM) data 341, and other data storage areas generally labeled as reference numeral 343. A pair of synchronization modules 216, 218 are operably connected to flash memory 335, including transport stack 206, as shown. Synchronization modules 216, 218 facilitate synchronization of the data stored in mobile communication device 116 and external devices. In the embodiment shown in FIG. 3, over the air synchronization module 216 facilitates synchronization via at least one wireless communication path, while wired synchronization module 218 facilitates synchronization via at least one wired communication path.

Figure 4:
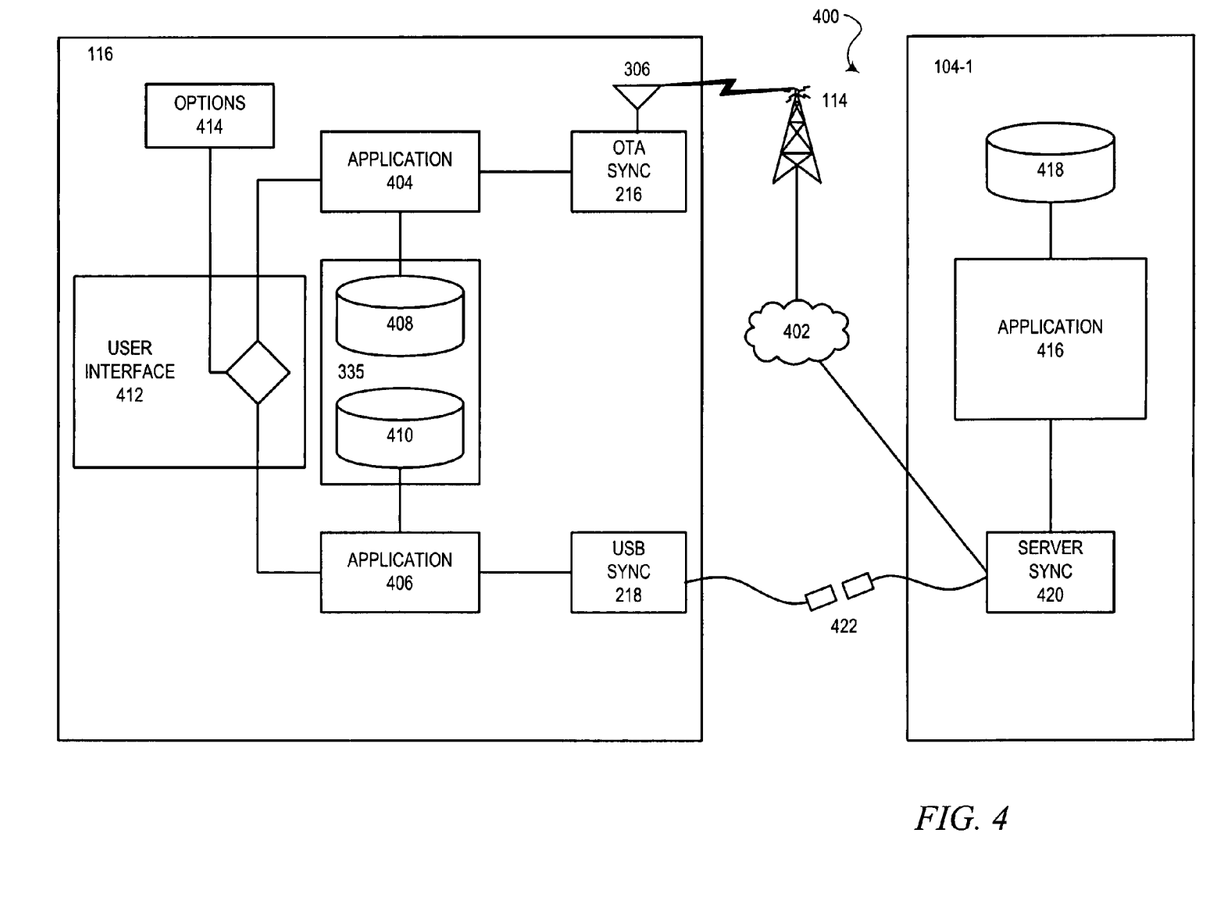
FIG. 4 depicts a block diagram of a mobile communications system operable to selectively synchronize data between a user preferred application and a related remote application according to one embodiment.

FIG. 4 depicts a block diagram of a mobile communications system architecture 400 according to one embodiment. Mobile communications device 116 communicates through base station 114. The network 402 through which mobile communications device 116 communicates may represent a combination of other networks, including, as examples, wireless network 112, relay network 110, internet 108 and enterprise network 102 shown in FIG. 1 and described in connection therewith. Network 402 may, of course, have a different architecture, depending on the particular application.

Mobile communication device 116 incorporates two applications 404, 406 having overlapping functionality. In one embodiment, resident applications 404, 406 are calendar applications. In other embodiments, device resident applications 404, 406 may be messaging or contacts management applications, as examples. Each of device resident applications 404, 406 stores its data in one of device resident databases 408, 410 within flash memory 335. Because there is overlapping functionality between device resident application 404 and device resident application 406, there is a significant potential for confusion if both of device resident applications 404, 406 are persistently available to the user. For example, in the embodiment wherein device resident applications 404, 406 are calendaring applications, the user could store an appointment within one of device resident applications 404, 406, and then schedule a different appointment in the same time slot on the other of device resident applications 404, 406. The first appointment would be stored in device resident database 408 and not device resident database 410, while the second appointment would be stored in device resident database 410 and not device resident database 408. As a result, the user would have two mutually-inconsistent appointments scheduled for that same time slot. There are a number of other potentially confusing situations which could result from the use of two calendaring applications having two completely separate databases.

In order to prevent the above-described calendaring problem and other possible undesirable situations, mobile communication device 116 incorporates a user interface module 412 operable to prevent the user from having access to both of device resident applications 404, 406 during the same period of time. Access to device resident applications 404, 406 is controlled according to options selected using an options module 414. Using options module 414, the user is presented with the option of using either device resident application 404 or device resident application 406, but not both. Once a preferred application is selected from device resident application 404 and device resident application 406, the user will not have access to the non-preferred application unless and until the user accesses options module 414, deselects the previously preferred application and selects the newly preferred application. In certain embodiments, identification of a new user-preferred application may generate an automatic synchronization of the database contents between the previously preferred application and the newly preferred application. In other embodiments, synchronization may be at a user's option. In certain embodiments, the non-preferred application may be hidden from user access entirely. In alternate embodiments, the non-preferred application may be represented by a "greyed out" icon or menu item. Other representations are familiar to those of skill in the art of user interface design.

Mobile communication device 116 incorporates over the air synchronization module 216 and wired synchronization module 218, which facilitate data synchronization between mobile communication device 116 and application server 104-1. In particular, over the air synchronization module 216 and wired synchronization module 218 facilitate data synchronization between at least one of device resident database 408 and device resident database 410 on the one end, and related server database 418 on the other. Each of device resident applications 404, 406 has access to at least one of over the air synchronization module 216 and wired synchronization module 218. In certain embodiments, device resident application 404 or device resident application 406 may have at least partial access to more than one of over the air synchronization module 216 and wired synchronization module 218. Over the air synchronization module 216 facilitates data synchronization through a wireless, or "over the air" communication path through antenna 306, base station 114 and network 402, while wired synchronization module 218 facilitates data synchronization via a wired connection 422.

Application server 104-1 is running related server application 416, which is operable to interface and synchronize with either device resident application 404 or device resident application 406 via server synchronization module 420 and the currently selected one of over the air synchronization module 216 and wired synchronization module 218. In certain embodiments, the identity of the preferred application and the associated communication path are transparent to the related server application 416. Accordingly, there is no need to update the related server application 416 to a change in the identity of the preferred application. In alternate embodiments, selection of a new user preferred application may result in the generation of an update message to related server application 416 informing related server application 416 of the identity of the newly selected user preferred application. This message may also include an identification the communication path through which future synchronization is to take place.

Figure 5:
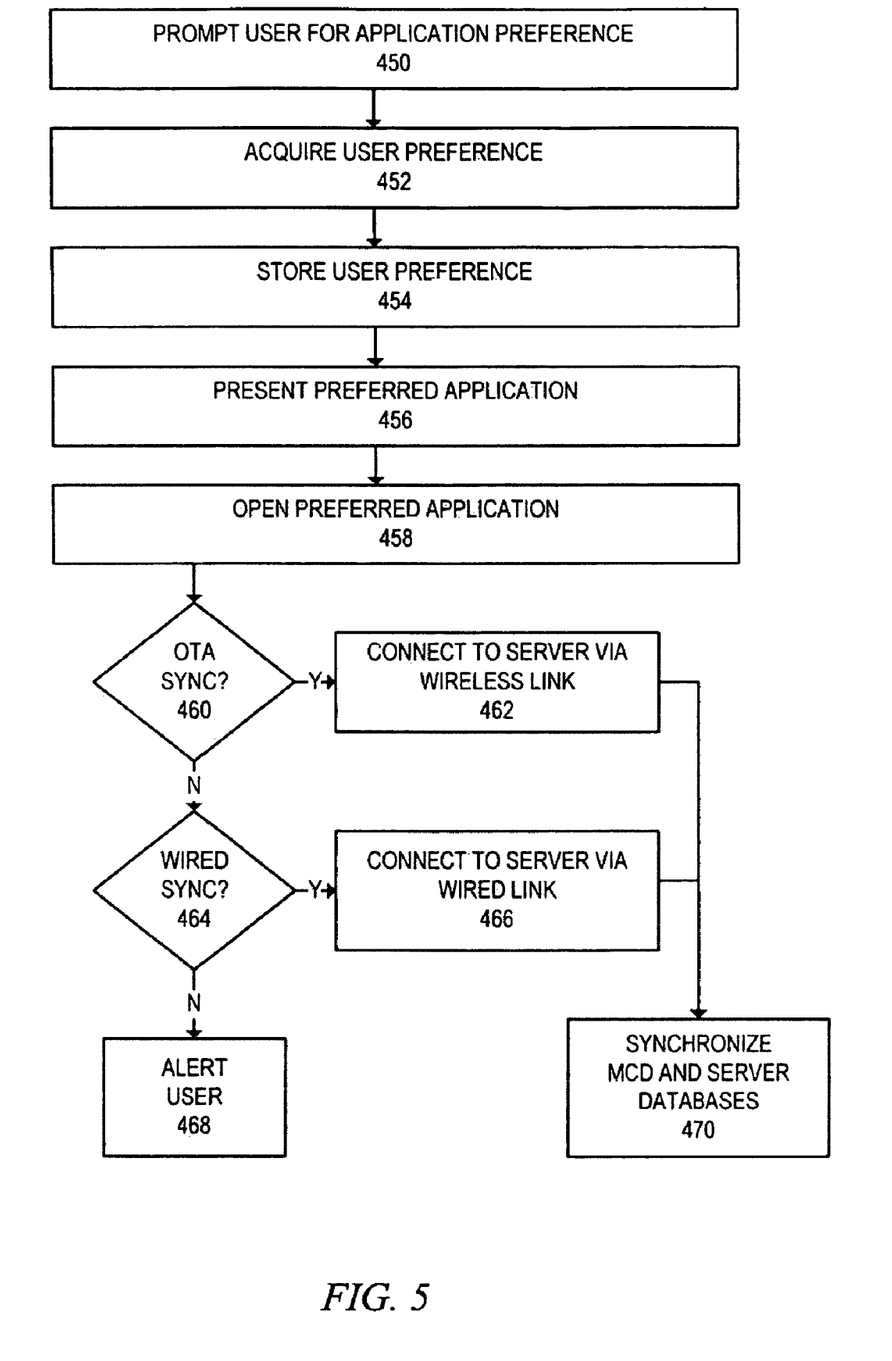
FIG. 5 depicts a flow chart showing the process flow for selectively synchronizing data between a user preferred application and a related remote application according to one embodiment.

FIG. 5 depicts a flow chart 500 showing one embodiment of a process flow for synchronization of databases within a mobile communications system. Process flow begins at block 450, where the options module 414 on the mobile communication device 116 prompts the user for a preference of one of at least two resident applications having overlapping functionality. In one embodiment, the user is asked to select between two calendaring applications. The system then acquires the user's preference (block 452) and stores the preference (block 454). Subsequently, the preferred application is presented to the user (block 456). This presentation may be, for example in the form of an icon displayed on the display of the mobile communication device 116. At a certain point in time, the mobile communication device 116 opens the preferred application (block 458).

In the embodiment shown in FIG. 5, the mobile communication device 116 is operable to synchronize the databases associated with a preferred application via a wireless, or "over the air" communication path or via a wired communication path. In this embodiment, each of the two resident applications are associated with only one communication path. In alternate embodiments, one or more of the resident applications may be operable to synchronize data via multiple communication paths.

In decision block 460, the system determines whether the system is currently operable for over the air, or "OTA" synchronization. This inquiry relates both to whether there is an available wireless communication path to a server and whether the presently preferred application is operable to conduct over the air synchronization. Although this discussion specifically relates to a packet switched cellular connection, possible wireless communication paths may include, but are not limited to, an IEEE 802.11 ("WiFi") link, an IEEE 802.15.2 ("Bluetooth") link or an IrDA (infrared) link, as examples. If both of the above conditions are TRUE, then process flow continues to block 462, where the application connects to a server via a wireless link, and then to block 470, where the preferred application and a related application resident on the server synchronize the database resident on the mobile communication device 116 and the related database on the server.

Process flow proceeds from decision block 460 to block 462 only if the system is currently operable for over the air synchronization. The system may, however, not currently be operable for over the air synchronization. This could result, for example, from the unavailability of a wireless communication path between the mobile communication device 116 and a server. Alternately, the currently preferred application may not be coded for over the air synchronization.

If for any reason the system is not currently operable for over the air synchronization, process flow proceeds from block 460 to decision block 464. In decision block 464, the system determines whether the system is currently operable for wired synchronization. As above, this operability requires that there be an available wired communication path to a server and that the currently preferred application is coded for wired synchronization. Examples of wired communication paths include, but are not limited to, a Universal Serial Bus (USB) link, a PSTN connection, a digital subscriber line ("DSL") connection, an EIA323/RS232 link, an IEEE-1394 ("Firewire") link and an Ethernet link. If a wired communication path is available, process flow proceeds from decision block 464 to block 466, where the preferred application connects to the server via a wired link, and then to block 470, where the system synchronizes the two databases.

In certain circumstances, the preferred application may not be able to synchronize with the server via either a wireless communication path (decision block 460) or a wired communication path (decision block 464). Under such circumstances, process flow proceeds to block 468. Certain embodiments of the system will alert the user as to lack of synchronization operability. This alert may take the form of a text alert or an audio alert, as examples.

Figure 6:
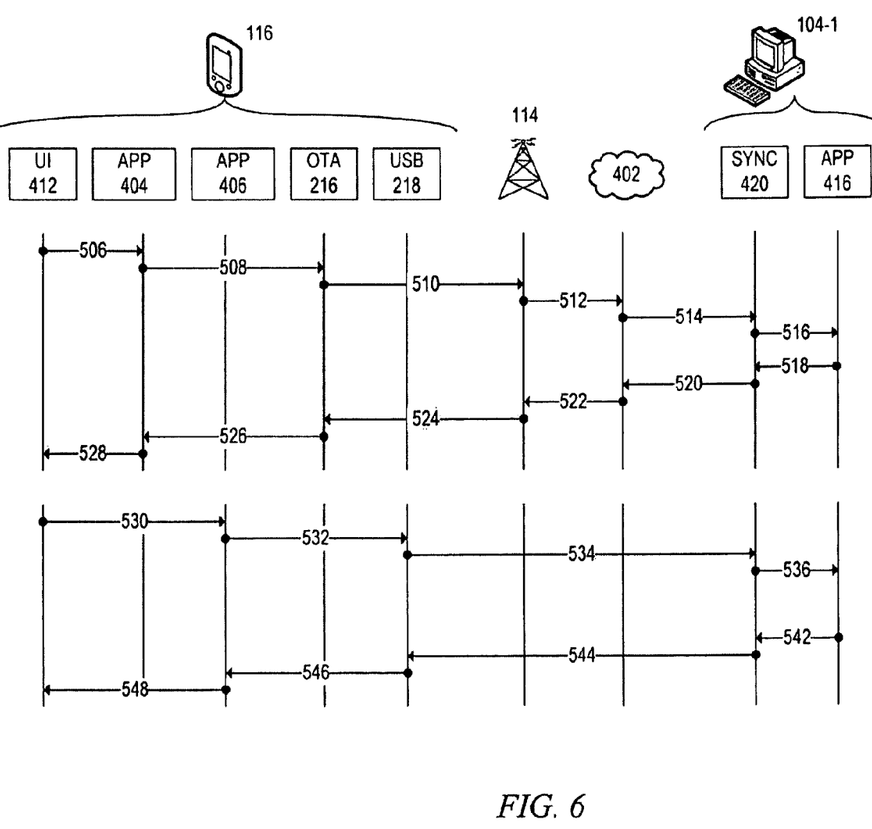
FIG. 6 depicts a message flow diagram showing a message flow selectively synchronizing data between a user preferred application and a related remote application according to one embodiment.

FIG. 6 depicts a message flow diagram showing the flow of communications between mobile communications device 116 running two device resident applications 404, 406 and server 104-1 running a related host application operable to interface and synchronize with each of the two device resident applications 404, 406. Initially, device resident application 404 is the preferred application. Device resident application 404 is operable to communicate and synchronize via a wireless communication path. Message flow begins with message 506 from user interface 412 to device resident application 404 modifying the contents of the database related to device resident application 404. Device resident application 404 is operable to alert related server application 416 to the modification, represented by message 508 from device resident application 404 to over the air synchronization module 216, which is forwarded as message 510 from over the air synchronization module 216 to base station 114, message 512 from base station 114 to network 402 and message 514 from network 402 to server synchronization module 420. Upon receipt of message 514, synchronization module 420 generates message 516 from synchronization module 420 to related server application 416, advising it of the need to update related server database 418.

After related server database 418 has been updated, related server application 416 generates a confirmation message 518 from related server application 416 to server synchronization module 420, which is then forwarded as message 520 from server synchronization module 420 to network 402, message 522 from network 402 to base station 114 and message 524 from base station 114 to over the air synchronization module 216. Over the air synchronization module 216 then forwards this information, as represented by message 526 from over the air synchronization module 216 to device resident application 404. Device resident application 404 then generates message 528 from device resident application 404 to user interface 412, thereby informing the user that the change has been entered.

Subsequent in time to the above, the user decides to use device resident application 406 as the preferred application. Device resident application 406 is operable to communicate and synchronize via a wired communication path. Update of the databases begins with message 530 from user interface 412 to device resident application 406, alerting device resident application 406 of the change. After the change is effectuated within the mobile communication device 116, device resident application 406 generates message 532 from device resident application 406 to wired synchronization module 218, which is forwarded as message 534 from wired synchronization module 218 to server synchronization module 420 and then message 536 from server synchronization module 420 to related server application 416. After updating related server database 418, related server application 416 generates message 542 from related server application 416 to server synchronization module 420. Message 542 is forwarded as message 544 from server synchronization module 420 to wired synchronization module 218 and then message 546 from wired synchronization module 218 to device resident application 406. Upon receipt of message 546, device resident application 406 generates message 548 from device resident application 406 to user interface 412, informing the user of the successful update.

It is believed that the operation and construction of the embodiments of the present disclosure will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A mobile communication device comprising:
   a first application operable to communicate and synchronize, via a first communication path comprising a wireless link, with a remote application operating on an external computer;
   a second application operable to communicate and synchronize with the remote application via a second communication path; and
   a third application operable to receive a user identification of a preferred application selected from one of the first and second applications and to restrict user access to the other one of the first and second applications, and using a communications path associated with the preferred application to synchronize the mobile communication device with the external computer.

2. The mobile communication device as recited in claim 1 wherein the first application, the second application and the remote application are of the same type.

3. The mobile communication device as recited in claim 1 wherein the first application, second application and remote application are at least one of a calendar application, a messaging application and a contacts management application.

4. The mobile communication device as recited in claim 1 wherein the wireless link is selected from a cellular link, a WiFi link, a Bluetooth link, a Zigbee/IEEE 802.15.4 link and an infrared link.

5. The mobile communication device as recited in claim 1 wherein the second communication path comprises a wired connection between the mobile communication device and the remote computer.

6. The mobile communication device as recited in claim 5 wherein the wired connection comprises one of a USB connection, an IEEE-1394 connection, a PSTN connection, an RS-232 connection and an Ethernet connection.

7. A method of synchronizing data between a mobile communication device and an external computer, the method comprising the steps of:
   receiving from a user an identification of a preferred application selected from a first application operable to communicate and synchronize via a first communication path comprising a wireless link with a related remote application executing on the external computer and a second application operable to communicate and synchronize via a second communication path with the related remote application executing on the external computer;
   storing data associated with the preferred application on the mobile communication device;
   storing data associated with the related remote application on the external computer;
   establishing a connection from the mobile communication device to the external computer via a communication path associated with the preferred application; and
   synchronizing data associated with the preferred application with data associated with the related remote application via the communication path associated with the preferred application.

8. The method as recited in claim 7 wherein the first application, the second application and the remote application are of the same type.

9. The method as recited in claim 7 wherein the first application, second application and remote application are at least one of a calendar application, a messaging application and a contacts management application.

10. The method as recited in claim 7 wherein the wireless link is selected from a cellular link, a WiFi link, a Bluetooth link, a Zigbee/IEEE 802.15.4 link and an infrared link.

11. The method as recited in claim 7 wherein the second communication path comprises a wired connection between the mobile communication device and the remote computer.

12. The method as recited in claim 11 wherein the wired connection comprises one of a USE connection, an IEEE-1394 connection, a PSTN connection, an RS-232 connection and an Ethernet connection.

13. A mobile communication system comprising:
   a mobile computing device having a first application and a second application stored thereon;
   an external computer having a related remote application executing thereon;
   means for storing data associated with the first application and second application on the mobile communication device;
   means for storing data associated with the related remote application on the external computer;
   first means for communicating and synchronizing, via a first communication path comprising a wireless link, the first application to the related remote application;
   second means for communicating and synchronizing, via a second communication path, the second application to the related remote application; and
   means operable to receive a user identification of a preferred application selected from the first application and second application and to restrict user access to the other of the first and second applications, thereby using a communication path associated with the preferred application to synchronize the mobile communication device with the external computer.

14. The mobile communication system as recited in claim 13 wherein the first application, the second application and the remote application are of the same type.

15. The mobile communication system as recited in claim 13 wherein the first application, second application and remote application are at least one of a calendar application, a messaging application and a contacts management application.

16. The mobile communication system as recited in claim 13 wherein the wireless link is selected from a cellular link, a WiFi link, a Bluetooth link, a Zigbee/IEEE 802.15.4 link and an infrared link.

17. The mobile communication system as recited in claim 13 wherein the second communication path comprises a wired connection between the mobile communication device and the remote computer.

* * * * *